March 23, 1926.
C. VAN DEVENTER
AIR CLARIFIER
Filed Nov. 8, 1922
1,577,990
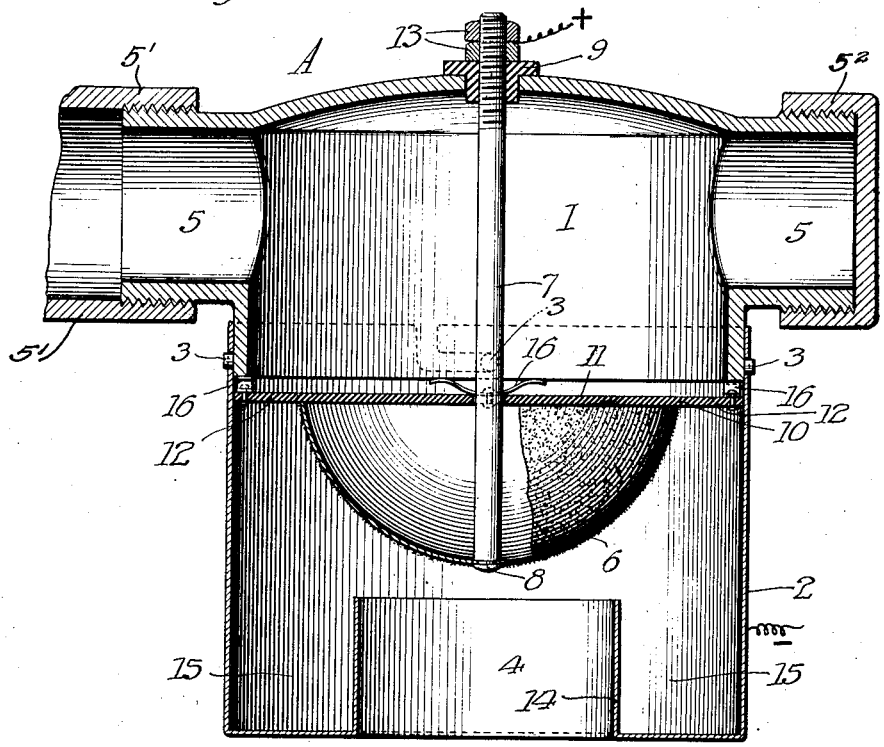
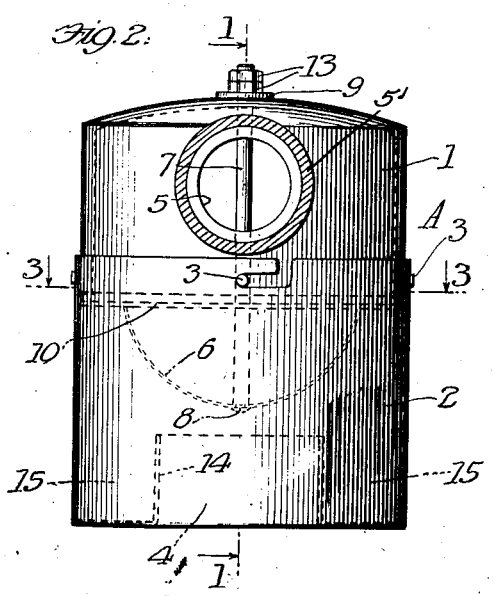
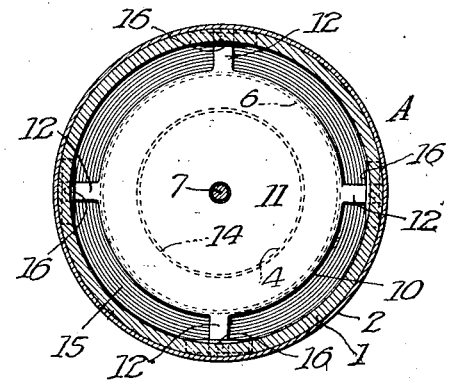
Inventor
Christopher Van Deventer Patented Mar. 23, 1926.

1,577,990

UNITED STATES PATENT OFFICE.

CHRISTOPHER VAN DEVENTER, OF CHICAGO, ILLINOIS.

AIR CLARIFIER.

Application filed November 8, 1922. Serial No. 599,658.

*To all whom it may concern:*

Be it known that I, CHRISTOPHER VAN DEVENTER, a citizen of the United States, and a resident of Chicago, in the county of Cook and State of Illinois, have invented an Improved Air Clarifier, of which the following is a specification.

This invention relates to air clarifiers.

As is generally well recognized by those familiar with the operation of internal combustion engines, the presence of dust, grit and other dirt in the air supplied to such engines is objectionable for the reasons, among others, that, in burning, the combustible portions of the dirt produce carbon which fouls the cylinders and pistons of the engine and the parts exposed therein, particularly the valves and spark plugs, which soon impairs their operation; while the gritty portions of the dirt produce wear of the cylinder and piston, causing leakage and defective operation. The deposit of carbon within the engine cylinders, with its attendant objectionable results—is increased by the deposit of unconsumed particles of dust and dirt on surfaces and parts exposed within the cylinders, said particles being also coated with carbon.

My improved air clarifier was developed with particular reference to use on internal combustion engines, and the object of the invention is to overcome the foregoing objectionable features by providing means for removing dust and other impurities from the air supplied to internal combustion engines.

In accordance with my invention, I attain the foregoing object by electrostatic means, whereby the dust and other impurities carried by the current of air supplied to an internal combustion engine will be withdrawn from such current into a zone of quiet, discharged and then permitted to fall by gravity into a settling chamber adapted to receive the same, from which it may be removed at intervals.

In what I now consider to be the preferable embodiment of my invention, as applied for clarifying the air supplied to an internal combustion engine, my improved air clarifier comprises a casing provided with air admission and discharge openings, the discharge opening of which is adapted to be connected to the air intake of the carburator of an internal combustion engine, supported within which, in substantially axial alignment with the air admission opening thereof, is an electrode consisting, preferably, of a piece of sheet copper shaped to form a hemisphere, which is so proportioned and positioned that a passageway will be formed between it and the side walls of the casing, which is several times the area of the air admission opening to the air clarifier casing, whereby the current of air passing through the clarifier casing will be reduced to such low velocity when passing said electrode— as compared with its velocity when entering the air admission opening of said casing— that its capacity as a vehicle for all kinds of dirt will be very low, thus permitting dirt in finely comminuted form to be withdrawn therefrom by electrostatic action and deposited into a settling chamber. Said electrode may conveniently be supported at the end of a metallic rod secured in the wall of the clarifier casing, and insulated therefrom by suitable means, and which is connected with the positive side of the generator, the clarifier casing being of such dimension that a charge of static electricity of desired potential will be imposed upon said electrode and an electrostatic field produced surrounding the same, without, however, jumping the gap between said electrode and the clarifier casing, said positive static charge on said electrode operating in a usual manner to induce a corresponding negative static charge on the clarifier casing. Also, said positively charged electrode is so positioned that dust and dirt entrained with the current of air entering the clarifier casing, will either come into direct contact with said positive electrode or will traverse the electrostatic field surrounding the same.

Also, the air admission opening to the clarifier casing is appreciably smaller than the end of the casing in which it is formed, the end of said casing outside of said admission opening being closed and a thimble being secured in the air admission opening which extends inwardly towards the electrode, thus providing a dead air space or settling chamber below said electrode and surrounding the air admission opening.

With the described construction, it is obvious that dust and dirt contained in the current of air entering the clarifier casing through the air admission opening thereof, by contact with the positive electrode or in traversing the static field surrounding the same, will become positively charged and will be repelled by the positive electrode and attracted by the negative electrode—that is—the section of the clarifier casing which surrounds said positive electrode—whereby said particles of dust and dirt will be drawn out of the current of air traversing said clarifier casing into contact with the negative electrode, electrically discharged, and deposited by gravity into the settling chamber in said clarifier casing.

For convenience in removing the dirt which accumulates in the clarifier, the settling chamber is preferably formed in a separate detachable section of the clarifier casing, which may quickly and conveniently be disconnected and removed when it is desired to empty the same.

As preferably constructed, also, the separate detached section of the clarifier casing in which the settling chamber is formed is made of copper and is so proportioned that it will extend above and surround the electrode supported in said clarifier casing, the ground connection for the clarifier casing being made directly thereto.

In accordance with my invention, also, in order to render the clarifier more effective in operation, the surface of the electrode is preferably roughened to provide a great number of very fine points or projections, thus intensifying the electrostatic field.

My invention also comprises the various other features and details of construction hereinafter described and claimed.

In the accompanying drawings in which my invention is fully illustrated,

Figure 1 is a sectional elevation of my improved air clarifier on the line 1—1 of Fig. 2.

Figure 2 is a side view, on a reduced scale, taken from the left side of Fig. 1; and Figure 3 is a sectional top plan view on the line 3—3 of Fig. 2.

Referring now to the drawings, A designates the casing of my improved air clarifier as a whole, said casing comprising an upper section 1 preferably made of cast aluminum, and a lower section 2 preferably made of sheet copper removably secured to the section 1 by any suitable means, desirable means for the purpose consisting of a bayonet joint, indicated at 3, see particularly Fig. 2.

As is generally well known to persons familiar with the construction and installation of internal combustion engines and carburetors therefor—particularly for use on automobiles—the carburetor is sometimes provided with but one source of air supply and sometimes with two, of which one is adapted to supply air to the carburetor at atmospheric temperature, and the other, air which has been pre-heated, usually by means of a waste gas heater.

To meet these different conditions, therefore, my improved clarifier is provided with two discharge openings 5, both or only one of which will be connected to the carburetor to meet the requirements of a given installation. When only one of said discharge openings has connection with the air intake of the carburetor, the other discharge opening will be closed by suitable means.

As shown in the drawings, one of the discharge openings is adapted to be connected with the intake by a pipe 5¹, and the other discharge opening is closed by a removable cap 5², in accordance with usual practice.

While, as shown, the casing of the clarifier is provided with two discharge openings, my invention contemplates the use of a single discharge opening, if desired.

Supported within the casing of the clarifier so as to be electrically insulated therefrom, is an electrode 6, said electrode being made of an electrical conductor, preferably sheet copper, the sides thereof diverging upwardly and outwardly, said electrode being preferably substantially hemispherical in shape.

As shown, the electrode 6 is supported by a rod 7 which is an electrical conductor, being preferably made of copper, the lower end of said rod being reduced in size, forming a shoulder on said rod and the reduced portion thereof extending through a hole formed in the electrode 6, and being riveted over said electrode, all as shown at 8, Fig. 1. The upper end of the rod 7 is secured in the top wall of the upper section 1 of the clarifier casing, being insulated from said casing by an insulating bushing 9, through which said rod extends, said bushing comprising a flange or collar which bears against the outside of the top wall of the casing surrounding the hole therein through which the body portion of the bushing extends. The electrode 6 is supported in the clarifier casing in axial alignment with the air admission opening 4 by means of a spider 10, made of fibre or other suitable insulating material, comprising a central portion 11 adapted to form a cover for the open upper side of said electrode and peripheral projections 12, the ends of which are fitted to the inside of the lower section 2 of the clarifier casing and which are adapted to extend beneath the lower end of the walls of the upper section 1 of the clarifier casing, said electrode securing means also comprising nuts 13 threaded to the upper end of the rod 7 above the bushing 9 and which bear against the upper side thereof.

With the described construction, it is obvious that the spider 10, through engagement of the projections 12 thereon with the lower end of the upper section of the clarifier casing, in addition to centering the electrode 6, will form an anchorage for said electrode when the nuts 13 are tightened.

The lower end of the casing A is relatively much larger than the air admission opening 4 therein, and said opening is extended upwardly towards the electrode 6 by means of a flange or thimble 14 which forms a settling chamber 15 at the lower end of the clarifier casing surrounding the air admission opening 4, into which the dust and dirt separated from the air entering the casing of the apparatus in operation, will be deposited and from which it may conveniently be removed by detaching the lower section 2 of the clarifier casing and emptying the settling chamber 15.

As shown, the effective spark gap between the electrode 6 and the lower section 2 of the clarifier casing is defined by the distance which separates the upper edge of the thimble 14 from the surface of said electrode, and to adapt the clarifier for use with static charges of different potential, means are preferably provided for varying the length of the spark gap. To this end, the electrode 6 is supported so as to be adjustable towards and from the open upper end of said thimble. As shown, this capacity for adjustment is provided by means of springs 16 secured to the peripheral projections 12 of the spider 10 which engage the shoulder formed by the lower end of the upper section 1 of the clarifier casing and with the nuts 13 threaded to the rod 7 will afford the adjustment desired, in an obvious manner.

My invention, however, contemplates equally omitting the springs 16 and engaging the spider arms 12 directly with the lower end of the upper casing section 1.

As installed for use, the electrode 6 is adapted to be electrically connected with the positive terminal of the high potential or ignition side of the magneto of the engine or other electrical generator, the nut threaded to the upper end of the rod 7 affording convenient means for this purpose. Also, the lower section 2 of the clarifier casing is adapted to be connected to the terminal of the magneto or other generator, other than that to which the electrode 6 is connected or, preferably, to be grounded, whereby the electrode 6 and the lower section 2 of the clarifier casing will become charged with static electricity of opposite potential. Also, the electrode 6 is supported in such relation to the side walls of the casing section 2 that the static charge will not jump the gap between said electrode and the clarifier casing.

In practice, the diameters of the lower section 2 of the clarifier casing and of the electrode 6 are so proportioned that the area of the space between the largest diameter of said electrode and the side wall of the casing will be several times the area of the air admission opening 4, thus correspondingly reducing the velocity of the air as it passes upwards around said electrode and its capacity as a vehicle for dust and dirt contained therein.

In operation, the current of air entering the air admission opening 4 of the clarifier, will strike the lower surface of the electrode 6 and will be diverted outwardly on all sides thereof, the particles of dust and dirt conveyed by said current of air striking against the surface of the electrode, or passing through the electro-positive field surrounding said electrode, as the air current passes upwardly around the same, thereby receiving an electro-positive static charge, said particles thereupon being repelled by the electrode 6 and attracted by the negative electrode formed by the lower section 2 of the clarifier casing, whereby said particles will be drawn into contact with said casing and out of the current of air passing upwardly through the clarifier casing, thus being discharged and becoming inert and falling by gravity into the settling chamber 15, from which it may be removed by merely detaching and emptying the lower section 2 of the clarifier casing.

Also, as previously stated, in order to render the clarifier more effective in operation, the surface of the electrode 6 is preferably roughened to provide a great number of very fine points or projections thereon, thus intensifying the potential of the static charge at said points or projections. The surface of said electrode may conveniently be thus roughened by means of a sand blast or electrolytic action.

I claim:

1. In an air clarifier the combination of a casing provided with air admission and discharge openings, said casing comprising a metallic section in the end of which the air admission opening is formed, an electrode supported within said metallic casing section in line with the air admission opening and in spaced relation to the side walls of said metallic casing section, said electrode consisting of a metallic body the surface of which adjacent to the air admission opening is upwardly and outwardly flared, and the means supporting which is constructed and arranged to insulate said electrode from the metallic casing section which surrounds it, said electrode being designed to be electrically connected to the positive terminal of the ignition or high potential side of a magneto or other electric generator, and the metallic casing section surrounding said electrode being grounded, whereby a static electric field of high intensity will be produced surrounding said electrode through which the current of air entering said casing, together with particles of dust and dirt entrained thereby will pass.

2. An air clarifier as specified in claim 1, in which the surface of the electrode adjacent to the air admission opening is convex.

3. An air clarifier as specified in claim 1, in which the electrode supported within the metallic casing section is larger than the air admission opening and the metallic casing section is sufficiently large so that a passageway will be formed between said casing section and the largest diameter of said electrode the area of which is several times that of the air admission opening.

4. An air clarifier as specified in claim 1, in which a thimble surrounds the air admission opening to the clarifier casing and extends into the same, forming a settling chamber between said thimble and the side wall of said clarifier casing.

5. An air clarifier as specified in claim 1, in which a thimble surrounds the air admission opening to the clarifier casing and extends into the same, forming a settling chamber between said thimble and the side wall of said clarifier casing, the section of the casing in which said settling chamber is formed being detachable.

6. An air clarifier as specified in claim 1, in which a thimble surrounds the air admission opening to the clarifier casing and extends into the same, forming a settling chamber between said thimble and the side wall of said clarifier casing, and the effective electrostatic field between the metallic casing section and the electrode supported therein is defined by the distance which separates said electrode and the upper edge of the thimble which surrounds the air admission opening to said clarifier casing.

7. An air clarifier as specified in claim 1, in which a thimble surrounds the air admission opening to the clarifier casing and extends into the same, forming a settling chamber between said thimble and the side wall of said clarifier casing, and the effective electrostatic field between the metallic casing section and the electrode supported therein is defined by the distance which separates said electrode and the upper edge of the thimble which surrounds the air admission opening to said clarifier casing, said electrode and thimble being relatively adjustable to provide for varying the intensity of the electrostatic field.

8. An air clarifier as specified in claim 1, in which a thimble surrounds the air admission opening to the clarifier casing and extends into the same, forming a settling chamber between said thimble and the side wall of said clarifier casing, and the effective electrostatic field between the metallic casing section and the electrode supported therein is defined by the distance which separates said electrode and the upper edge of the thimble which surrounds the air admission opening to said clarifier casing, the electrode being adjustably supported, said supporting means comprising a rod which is an electrical conductor to the end of which said electrode is secured, an insulating bushing secured in a wall of the clarifier casing through which said rod extends, a nut threaded to said rod, a spider slidably supported on said rod comprising arms fitted to the inside of the clarifier casing which interlock with rigid parts of said casing, and springs secured to said arms which react against the parts of the clarifier casing with which said arms interlock.

9. An air clarifier as specified in claim 1, in which the means for supporting the electrode comprises a rod which is an electrical conductor secured to the clarifier casing and insulated therefrom, and a spider secured to said rod comprising projections fitted to the inside of said clarifier casing.

10. An air clarifier as specified in claim 1, in which the means for supporting the electrode comprises a rod which is an electrical conductor secured to the clarifier casing and insulated therefrom, and a spider secured to said rod comprising arms or projections fitted to the inside of said clarifier casing which interlock with rigid parts of the clarifier casing.

11. An air clarifier as specified in claim 1, in which the means for supporting the electrode comprises a rod which is an electrical conductor secured to the clarifier casing and insulated therefrom, and a spider secured to said rod comprising arms or projections fitted to the inside of said clarifier casing, the electrode being hollow and said spider comprising a central portion which forms a cover for the open side thereof.

12. An air clarifier as specified in claim 1, in which the means for supporting the electrode comprises a rod which is an electrical conductor secured to the clarifier casing and insulated therefrom, and a spider secured to said rod comprising arms or projections fitted to the inside of said clarifier casing, the clarifier casing consisting of separate sections and the projections of the spider interlocking with the end of one of said sections.

13. An air clarifier as specified in claim 1, in which the surface of the electrode supported within the clarifier casing is roughened to form a multiplicity of fine points.

In witness that I claim the foregoing as my invention, I affix my signature this 1st day of November, A. D. 1922.

CHRISTOPHER VAN DEVENTER.